(12) United States Patent
Xu (10) Patent No.: US 12,301,896 B2
(45) Date of Patent: May 13, 2025

(54) AUDIO BULLET SCREEN PROCESSING METHOD AND DEVICE

(71) Applicant: SHANGHAI BILIBILI TECHNOLOGY CO., LTD., Shanghai (CN)

(72) Inventor: Xingwang Xu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/505,506

(22) Filed: Oct. 19, 2021

(65) Prior Publication Data

US 2022/0124383 A1 Apr. 21, 2022

(30) Foreign Application Priority Data

Oct. 20, 2020 (CN) .......................... 202011126393.2

(51) Int. Cl.
*H04N 21/422* (2011.01)
*G06F 16/635* (2019.01)
*H04N 21/231* (2011.01)
*H04N 21/233* (2011.01)
*H04N 21/234* (2011.01)
*H04N 21/43* (2011.01)
(Continued)

(52) U.S. Cl.
CPC ......... *H04N 21/233* (2013.01); *G06F 16/635* (2019.01); *H04N 21/231* (2013.01); *H04N 21/234* (2013.01); *H04N 21/431* (2013.01); *H04N 21/439* (2013.01); *H04N 21/44* (2013.01); *H04N 21/47* (2013.01)

(58) Field of Classification Search
None
See application file for complete search history.

(56) References Cited

U.S. PATENT DOCUMENTS 6,528,715 B1 * 3/2003 Gargi .................. G10H 1/0033
 84/645
9,496,843 B1 * 11/2016 Chawandi ............ H03G 3/3026
(Continued)

FOREIGN PATENT DOCUMENTS

CN 102930861 A 2/2013
CN 105898557 A 8/2016
(Continued)

*Primary Examiner* — Brian T Pendleton
*Assistant Examiner* — Jean D Saint Cyr
(74) *Attorney, Agent, or Firm* — BakerHostetler (57) ABSTRACT

The present disclosure describes techniques for generating and presenting audio bullet screens. The techniques comprise receiving a first instruction of generating an audio bullet screen associated with a video from a first client computing device associated with a first user; determining an interface based on the first instruction; transmitting data indicative of the interface to the first client computing device; receiving information indicative of a music score from the first client computing device, wherein the music score is determined based on user input by the first user via the interface; generating the audio bullet screen based on the music score; storing the music score corresponding to the audio bullet screen; and transmitting data indicative of the audio bullet screen to a second computing device associated with a second user that is playing the video.

20 Claims, 7 Drawing Sheets

(51) Int. Cl.
*H04N 21/431* (2011.01)
*H04N 21/439* (2011.01)
*H04N 21/44* (2011.01)
*H04N 21/47* (2011.01)
*H04N 21/475* (2011.01)
*H04N 21/488* (2011.01)

(56) References Cited

U.S. PATENT DOCUMENTS

2014/0258309 A1* 9/2014 Young .............. G06F 16/24578
707/748
2020/0099988 A1* 3/2020 Liu .................... H04N 21/4882
2020/0335072 A1* 10/2020 Liu ....................... G10H 1/344

FOREIGN PATENT DOCUMENTS

| CN | 107613400 | * | 1/2018 |
| CN | 107613400 A | * | 1/2018 |
| CN | 109951743 A | | 6/2019 |
| CN | 110491355 A | | 11/2019 |
| CN | 111787346 | * | 10/2020 |

* cited by examiner

AUDIO BULLET SCREEN PROCESSING METHOD AND DEVICE

CROSS-REFERENCE TO RELATED APPLICATION

The present application claims priority to Chinese Patent Application No. 202011126393.2, titled "AUDIO BULLET SCREEN PROCESSING METHOD AND DEVICE", filed on Oct. 20, 2020 with the National Intellectual Property Administration, PRC, which is incorporated herein by reference in its entirety.

FIELD

The present disclosure relates to the field of computer technologies, and in particular to an audio bullet screen processing method and device, a computing device, and a computer-readable storage medium.

BACKGROUND

Bullet screens represent a kind of user comments displayed in videos. In the video field, a bullet screen may bring a viewer an experience of real-time interaction, which may greatly increase the interest and sense of participation of the viewer when watching the video.

Currently, in the video field, bullet screens mainly include text bullet screens and voice bullet screens, which are less interesting and have a single presentation mode.

SUMMARY

In view of this, an audio bullet screen processing method, an audio bullet screen processing device, a computing device, and a computer-readable storage medium are provided according to the embodiments of the present disclosure, to solve the problem in the conventional art that bullet screens are less interesting and have a single presentation way.

According to the first aspect of the embodiments of the present disclosure, an audio bullet screen processing method is provided, which includes receiving a first instruction of generating an audio bullet screen associated with a video from a first client computing device associated with a first user; determining an interface based on the first instruction; transmitting data indicative of the interface to the first client computing device; receiving information indicative of a music score from the first client computing device, wherein the music score is determined based on user input by the first user via the interface; generating the audio bullet screen based on the music score; storing the music score corresponding to the audio bullet screen; and transmitting data indicative of the audio bullet screen to a second computing device associated with a second user that is playing the video.

According to a second aspect of the embodiments of the present disclosure, a computing system is provided, which includes: at least one memory and at least on processor. The at least one memory stores computer-executable instructions, and the at least one processor is configured to execute the computer-executable instructions to perform operations of the audio bullet screen processing method as described above.

According to a third aspect of the embodiments of the present disclosure, a non-transitory computer-readable storage medium is provided, which includes computer-executable instructions stored thereon, where the computer instructions, when executed by a processor, performs operations of the audio bullet screen processing method as described above.

With the audio bullet screen processing method and system according to the embodiments of the present disclosure, an audio bullet screen generating instruction sent by a first user for a current video is received, and an audio bullet screen generating interface determined based on the audio bullet screen generating instruction is returned to the first user. An audio music score determined by the first user on the audio bullet screen generating interface is received, and an audio bullet screen is generated based on the audio music score. The audio music score corresponding to the audio bullet screen is saved, and the audio bullet screen is transmitted to a user terminal playing the current video. In this way, when a user is watching a current video, an audio bullet screen containing a music matching with the current video can be generated in the form of bullet screens for the current video, such that the audio bullet screen can be played subsequently for another user when the another user watches the current video. In this way, music sharing can be realized between users in the form of audio bullet screens, thereby improving interestingness and richness of bullet screens.

DETAILED DESCRIPTION OF EMBODIMENTS

Many specific details are explained in the following description, to fully understand the present disclosure. However, the present disclosure may be implemented in many ways other than those described herein, and those skilled in the art may make similar extensions without violating the connotation of the present disclosure. Therefore, the present disclosure is not limited by embodiments disclosed below.

The terms used in one or more embodiments of the present disclosure are only for the purpose of describing the specific embodiments, and are not intended to limit the one or more embodiments of the present disclosure. The singular forms of "a", "said" and "the" in the one or more embodiments and the claims of the present disclosure are also intended to include plural forms, unless being clearly indicated by other meanings in the context. It should also be understood that the term "and/or" in the one or more embodiments of the present disclosure refers to and includes any or all possible combinations of one or more associated listed items.

It is to be understood that although the terms "first", "second", and the like may be used to describe various kind of information in one or more embodiments of the present disclosure, the information should not be limited to these terms. These terms are only used to distinguish the same kind of information from each other. For example, without departing from the scope of one or more embodiments of the present disclosure, "the first" may also be referred to as "the second", and similarly, "the second" may also be referred to as "the first". Depending on the context, the word "if" used herein may be interpreted as "when" or "in a case that" or "in response to a determination".

First, terms involved in one or more embodiments of the present disclosure are explained.

A bullet screen usually refers to a comment that is presented along a time axis of a video when the video is displayed, and the bullet screen is usually in a form of text or voice. Bullet screens are typically animated when displayed. For example, the bullet screens may be shown scrolling (e.g., from right to left, left to right, top to bottom, bottom to top) across video frames.

An audio bullet screen specifically refers to a bullet screen containing music content.

MIDI refers to a Musical Instrument Digital Interface.

In the present disclosure, an audio bullet screen processing method, an audio bullet screen processing device, a computing device, and a computer-readable storage medium are provided, which are described in detail in the following embodiments.

The audio bullet screen processing method in the embodiments of the present disclosure may be applied to any field that needs to process audio bullet screens, such as the processing of audio bullet screen in the video field, the processing of audio bullet screen in the audio field, the processing of voice bullet screen in the communication field, and the processing of voice bullet screen in the we-media field. For ease of understanding, the embodiments of the present disclosure are described in detail by taking a case that the audio bullet screen processing method is applied to the processing of audio bullet screen in the video field as an example, but the present disclosure is not limited thereto.

In the case that the audio bullet screen processing method is applied to the processing of audio bullet screen in the video field, an audio bullet screen involved in the audio bullet screen processing method may refer to a bullet screen containing music.

In implementations, the audio bullet screen in the embodiments of the present disclosure may be presented on user terminals such as large-scale video playing devices, game consoles, desktop computers, smart phones, tablet computers, Moving Picture Experts Group Audio Layer III (MP3) players, Moving Picture Experts Group Audio Layer IV (MP4) players, laptop portable computers, e-book readers, and other display terminals.

In addition, the audio bullet screen involved in the audio bullet screen processing method of the embodiments of the present disclosure may be applied to any videos or audios that can present audio bullet screens, for example, the audio bullet screen may be presented in a live broadcast or recorded video. The audio bullet screen may also be presented by an audio for online or offline listening to songs, listening to books.

Figure 1:
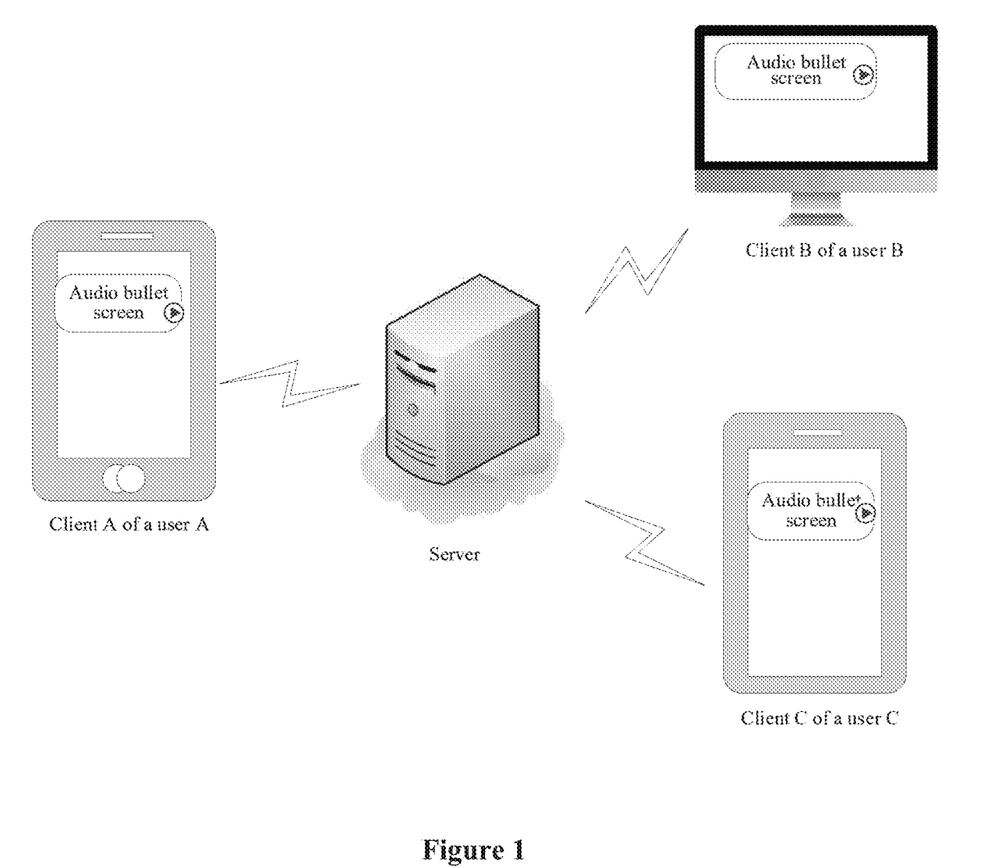
FIG. 1 is a system architecture diagram of an audio bullet screen processing method according to an embodiment of the present disclosure.

Reference is made to FIG. 1, which is a system architecture diagram of an audio bullet screen processing method according to an embodiment of the present disclosure.

In FIG. 1, a user A watches a video A through a first client computing device A. In a playing interface of the video A, the user A clicks on a bullet screen generating control in the playing interface of the video A to generate an audio bullet screen generating instruction for the video A, and the audio bullet screen generating instruction is transmitted to a server computing device. After receiving the audio bullet screen generating instruction, the server may return an audio bullet screen generating interface for the user A, and the audio bullet screen generating interface is displayed to the user A on the user terminal A. The user A may select a local midi music score on the audio bullet screen generating interface or input a digital numbered musical notation to form a midi music score on the audio bullet screen generating interface, and the midi music score is transmitted to the server. After receiving the midi music score, the server generates an audio bullet screen a based on the midi music score. Finally, the audio bullet screen a is presented, through synchronization, to a user B who is watching the video A through a second client computing device B and a user C who is watching the video A through a third client computing device C. The user B and the user C may click on a playing button following the audio bullet screen a, then the midi music score corresponding to the audio bullet screen a is parsed, thereby playing the audio bullet screen a.

Figure 2:
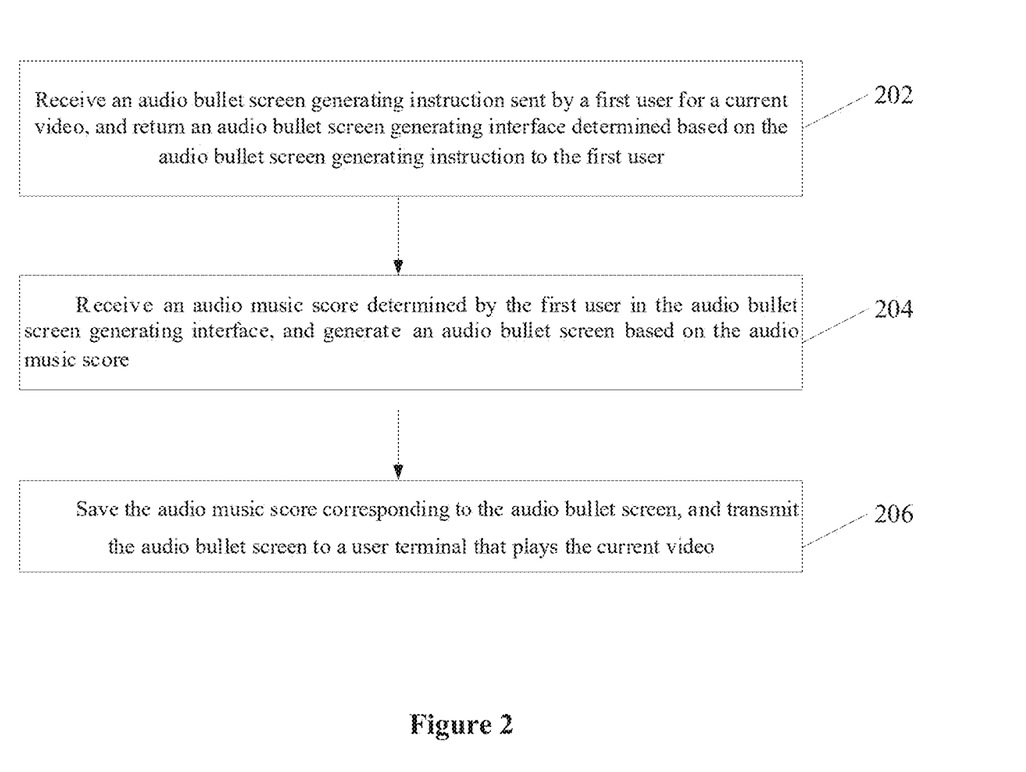
FIG. 2 is a flowchart of an audio bullet screen processing method according to an embodiment of the present disclosure.

Reference is made to FIG. 2, which is a flowchart of an audio bullet screen processing method according to an embodiment of the present disclosure. The method includes the following steps 202 to 206.

In step 202, an audio bullet screen generating instruction sent by a first user for a current video is received, and an audio bullet screen generating interface determined based on the audio bullet screen generating instruction is returned to the first user.

The first user may represent a user who is watching the current video, where the current video may be a live video, an on-demand video, or a recorded video, such as a live shopping video, a live sports video, a TV drama video, or a movie video.

In practice, receiving the audio bullet screen generating instruction sent by the first user for the current video may represent receiving the audio bullet screen generating instruction sent by the first user through a control on the first user terminal playing the current video. The first user terminal represents a user terminal of the first user, such as a mobile phone or a tablet computer of the first user.

For example, the first user terminal is a mobile phone, in a specific implementation, when the first user watches a video through the mobile phone, if the first user wants to generate an audio bullet screen for the current video played by the mobile phone, the first user may click on a bullet screen generating control in the current video playing interface of the mobile phone, select an "audio Bullet screen" option in a popped bullet screen window or directly click on the audio bullet screen generating control in the current video playing interface of the mobile phone to generate an audio bullet screen generating instruction. The audio bullet screen generating instruction is then transmitted to the server. The audio bullet screen generating instruction here may be the audio bullet screen generating instruction sent by the first user for the current video that is received by the server in the embodiment of the present disclosure.

In an implementation, after receiving the audio bullet screen generating instruction for the current video sent by the first user based on the first user terminal, the server determines the audio bullet screen generating interface based on the audio bullet screen generating instruction, and returns the audio bullet screen generating interface to the first user, that is, to the first user terminal of the first user, and the audio bullet screen generating interface is presented to the first user on the first user terminal.

In step 204, an audio music score determined by the first user on the audio bullet screen generating interface is received, and an audio bullet screen is generated based on the audio music score.

The audio music score may be a midi music score. In practice, there are three ways to determine the midi music score, which will be described below.

The receiving the audio music score determined by the first user on the audio bullet screen generating interface includes: receiving a numbered musical notation text in a preset format that is selected by the first user on the audio bullet screen generating interface, and determining the numbered musical notation text as the audio music score; or receiving an audio file that is selected by the first user on the audio bullet screen generating interface, and parse the audio file into an audio music score in a preset format.

For example, the preset format is a midi format. Specifically, in a case that there is a local complete midi music score, that is, a complete midi numbered musical notation text, the first user may directly select the local midi numbered musical notation text through the audio bullet screen generating interface, the server determines the selected midi numbered musical notation text as an audio music score of the audio bullet screen to be generated. In a case that the user selects a local audio file, the server may parse the audio file based on a midi music score parser library, into a midi music score, and determines the midi music score as the audio music score of the audio bullet screen to be generated. In practice, the audio bullet screen processing method may also support audio music scores in other formats, as long as it is technically possible to generate an audio bullet screen based on the audio music score, it is possible to parse the audio music score corresponding to the audio bullet screen into a corresponding audio when the user terminal plays the bullet screen, and the audio bullet screen may be played. Further, the embodiment of the present disclosure supports using the midi audio music score to generate an audio bullet screen, if the numbered musical notation text selected by the user is not in the midi format, the numbered musical notation text may be converted into a music score in the midi format, and then the audio bullet screen may be generated and played.

In the embodiment of the present disclosure, the server may directly receive a numbered musical notation text in a preset format that is selected by the first user on the audio bullet screen generating interface, and determine the numbered musical notation text as the audio music score, or may generate the audio music score based on the local audio file that is selected by the first user, such that the user is unnecessary to edit the audio music score of the audio bullet screen to be generated, which is simple and fast.

In addition, the receiving the audio music score determined by the first user on the audio bullet screen generating interface includes: receiving a digital numbered musical notation in a preset format that is inputted by the first user on the audio bullet screen generating interface, and determining the digital numbered musical notation as the audio music score.

Further, in a case that there is no local midi music score for which the user wants to generate an audio bullet screen or the user wants to generate a customized midi music score, the first user may input a digital numbered musical notation in the preset format for the audio bullet screen to be generated through the audio bullet screen generating interface, so as to obtain the audio music score of the audio bullet screen to be generated. For example, the first user inputs the numbers 1, 2, 3, 4, 5, 6, 7 representing the notes through the audio bullet screen generating interface to form a digital numbered musical notation, and the digital numbered musical notation may be used as the audio music score of the audio bullet screen to be generated.

In the embodiment of the present disclosure, the server may receive a personalized audio music score determined based on the digital numbered musical notation in the preset format that is inputted by the first user on the audio bullet screen generating interface, and generate a personalized audio bullet screen based on the user-customized audio music score, which reflects the personalization and richness of the audio bullet screen.

In an implementation, after receiving the audio music score determined by the first user on the audio bullet screen generating interface in any of the above two ways, the server may generate the audio bullet screen based on the audio music score.

Specifically, in order to ensure the safety and compliance of the audio bullet screen, and create and maintain a healthy bullet screen publishing environment, after generating the audio bullet screen based on the audio music score, the audio bullet screen is usually detected for compliance as follows.

After generating the audio bullet screen based on the audio music score, the method further includes: acquiring an audio bullet screen compliance condition preset for the current video, and compare the audio bullet screen with the audio bullet screen compliance condition.

The audio bullet screen compliance condition is preset for the current video based on a requirement of the current video. For example, if the current video is a sensational video, in order to avoid a music that is greatly in contrast to an original sound of the current video and that may bring a bad experience to users, tones of the audio bullet screen may be restricted. That is, if the original sound of the current video is a soft music, the tone of the audio bullet screen cannot exceed a preset tone threshold. Alternatively, the preset audio bullet screen compliance condition may be that the audio bullet screen has no noise. In addition, in order to ensure that the audio bullet screen matches with the current video, the preset audio bullet screen compliance condition may indicate that a length of the audio bullet screen is less than a length of the current video, to avoid a case that the audio bullet screen has not ended when the current video is ended due to a reason that the length of the audio bullet screen is greater than the length of the current video, which may bring a bad experience for the user. Further, the audio content in the audio bullet screen may be detected for compliance to ensure that the audio bullet screen does not contain content on horror, violence and the like.

Specifically, before publishing the audio bullet screen to the current video, the audio bullet screen may be detected for compliance based on the audio bullet screen compliance condition preset for the current video, to ensure that the audio bullet screen published to the current video meets requirement of the current video, thereby ensuring the safety and compliance of audio bullet screen, thus creating and maintaining a healthy bullet screen publishing environment.

In step 206, the audio music score corresponding to the audio bullet screen is saved, and the audio bullet screen is transmitted to a user terminal playing the current video.

Specifically, after the audio bullet screen is generated based on the audio music score, the audio music score corresponding to the audio bullet screen is saved in an audio library, and the audio bullet screen is transmitted to all user terminals that play the current video.

In practice, in order to ensure the compliance of the audio bullet screen, the audio bullet screen is saved and transmitted only in a case that the audio bullet screen meets the audio bullet screen compliance condition for the current video. The implementation is described as follows.

The saving the audio music score corresponding to the audio bullet screen and transmitting the audio bullet screen to a user terminal playing the current video includes: in the case that the audio bullet screen meets the audio bullet screen compliance condition, saving the audio music score corresponding to the audio bullet screen, and transmitting the audio bullet screen in a preset format to the user terminal playing the current video.

Specifically, the preset format of the audio bullet screen may be set according to actual needs, for example, a playing button is arranged following the audio bullet screen. In practice, the user may click on the playing button to play a music of the audio bullet screen. Alternatively, the audio bullet screen may be displayed in the current video in a form of digital music score or music name or in a user-customized form, which is not limited in the present disclosure.

Figure 3:
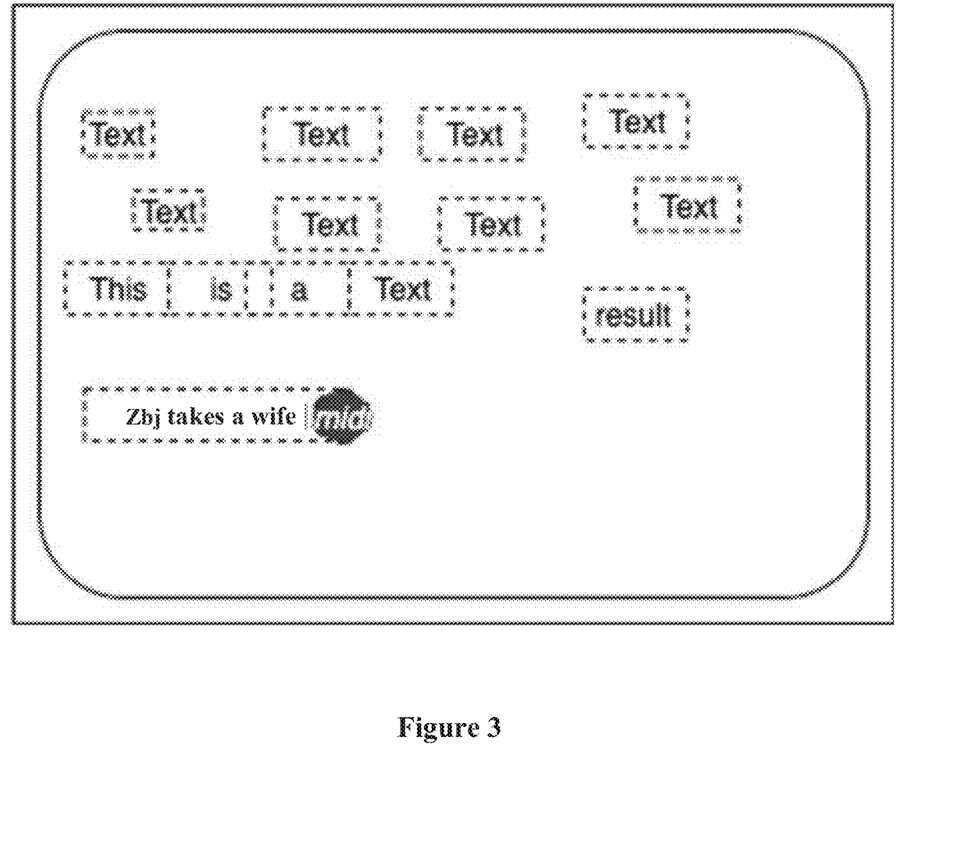
FIG. 3 is a schematic diagram of an audio bullet screen in an audio bullet screen processing method according to an embodiment of the present disclosure.

Reference is made to FIG. 3, which is a schematic diagram of an audio bullet screen in an audio bullet screen processing method according to an embodiment of the present disclosure.

FIG. 3 shows a bullet screen display form of the current video, and FIG. 3 includes text bullet screens and an audio bullet screen.

Specifically, "Text", "This is a Text", and "result" represent text bullet screens, and "zbj takes a wife" represents an audio bullet screen. A playing button "midi" is arranged following the audio bullet screen. A user may click on the playing button "midi" to play the audio bullet screen.

For example, in a specific scenario, a user 1 is a loyal fan of an area A and he likes watching spoof videos in area A. When the user 1 sees a video where a group of people carrying things walk crookedly in the area A, he thinks that the video is very funny and wants to upload an audio bullet screen for this the video. In this case, he clicks on "Upload midi bullet screen" in a playing interface of the video, selects a music "zbj takes a wife" in a popped audio bullet screen generating interface, and uploads the music to the server. After receiving the music, the server parses the music into the corresponding audio music score, generates an audio bullet screen of "zbj takes a wife" based on the audio music score, and the audio bullet screen is displayed on all user terminals that play the video.

In addition, in another scenario, the user 1 is a manual video uploader and likes to make music boxes. The user 1 published a video of a music box, and there is a nice sound of the music box in the video. When the video is published, may user ask where the music of the music box can be downloaded in the playing interface of the video. In this case, the user 1 uploads a music in the midi form as a midi bullet screen and presents the midi bullet screen to the playing interface of the video, so that all users who watch the video can click on the midi audio bullet screen to listen to the music of the music box, and can collect and download the midi audio bullet screen. That is, after receiving a collection or download instruction for the audio bullet screen generated by the user in the current video playing interface, the server collects or downloads an audio corresponding to the audio bullet screen, so that the user can playback the music that he likes. In this way, a communication way can be provided to users who like both the video and the music, and interaction can be realized between the users in the form of audio bullet screens, thereby improving the richness of the bullet screens.

In the embodiments of the present disclosure, the audio bullet screen is transmitted in a preset format and displayed in the playing interface of the current video, which is different from display ways of text bullet screens and voice bullet screens, thereby greatly improving the richness of the bullet screens. In addition, a display name of the audio bullet screen may be customized by a user in a preset format, thereby greatly improving the interestingness of the audio bullet screen and the interaction enthusiasm of users.

In another embodiment of the present disclosure, with the above method, after generating the audio bullet screen and transmitting the audio bullet screen to all user terminals that play the current video, operations for playing the audio bullet screen, commenting on the audio bullet screen and the like may be received from a second user who is watching the current video, and a specific implementation is described as follows.

The audio bullet screen processing method further includes: receiving a playing instruction of a second user for the audio bullet screen of the current video, where the playing instruction carries an identifier of the audio bullet screen; determining an audio music score corresponding to the audio bullet screen based on the identifier of the audio bullet screen; and parse the audio music score into an audio, and playing the audio for the second user on a user terminal playing the current video, where the second user is a user who watches the current video on the user terminal, and may include the first user.

Specifically, the receiving the playing instruction of the second user for the audio bullet screen of the current video represents receiving the playing instruction generated by the second user by clicking the audio bullet screen in the current video interface on the user terminal playing the current video, where the playing instruction carries the identifier of the audio bullet screen.

Following the above example, for example, in a scenario where an audio bullet screen of "zbj takes a wife" is popped in the playing interface of the current video when the user 2 watches the current video on the user terminal, the user 2 clicks on the audio bullet screen of "zbj takes a wife" to play the music of the audio bullet screen.

After receiving the playing instruction for the audio bullet screen, the audio music score corresponding to the audio bullet screen is searched for based on the identifier of the audio bullet screen, the audio music score is parsed into the corresponding audio, and the audio of the audio bullet screen is played for the second user on the user terminal playing the current video.

In the embodiment of the present disclosure, when watching the current video, the user may share a music in the form of audio bullet screen with other users who watch the current video in the playing interface of the current video, and other users may click on the audio bullet screen in the playing interface of the current video, to play the audio bullet screen. In this way, music sharing can be realized between users in the form of audio bullet screens, which can provide users who watch the current video with a good and interesting music exchange way, thereby improving the user experience.

In an implementation, the parsing the audio music score into an audio includes: parsing the audio music score based on a music score parser library into an audio corresponding to the audio bullet screen, where the audio music score is parsed the music score parsing library, into an audio file of the audio bullet screen corresponding to the audio music score.

In an implementation, the audio music score corresponding to the audio bullet screen is acquired from the server based on the identifier of the audio bullet screen, and the audio music score is parsed based on the music score parser library, into the audio corresponding to the audio bullet screen.

Still taking the audio music score in the midi format as an example, in a case that the audio music score is in the midi format, the music score parser library is a midi music score parser library that may be used to parse audio music scores in the midi format, and with the midi music score parser library, a midi audio music score may be parsed into the corresponding audio, or the audio may be parsed into the corresponding midi audio music score.

In the embodiments of the present disclosure, with the music score parser library, the music corresponding to the audio bullet screen can be quickly and accurately obtained, so as to play the audio bullet screen, thereby saving system processing time, thus improving playing efficiency of the audio bullet screen.

In another embodiment of the present disclosure, playing the audio for the second user on a user terminal playing the current video includes: in a case that the user terminal playing the current video is detected and a video sound of the current video is turned off, playing the audio for the second user.

In practice, when the audio bullet screen is played in the playing interface of the current video, the sound of the current video may be mixed with the music of the audio bullet screen, which may bring a bad experience to the user. In this case, when the user clicks to play the audio bullet screen in the current video interface, the server may turn off the video sound of the current video, so that the user can watch the current video based on the sound of the audio bullet screen. In many cases, the music in the audio bullet screen is a music that the user thinks to be matching with the current video, therefore, the video sound of the current video is turned off when the user is playing the audio bullet screen, so that the user can enjoy the music of the audio bullet screen and watch the current video with funny or soothing music in the audio bullet screen, thereby improving the interestingness and richness of viewing the current video.

In an embodiment, after the playing the audio for the second user on a user terminal playing the current video, the method further includes: in a case that a playing instruction for another audio bullet screen of the current video is received from the second user when the audio is being played, stopping the audio, and playing an audio corresponding to the another audio bullet screen for the second user on the user terminal playing the current video.

Specifically, multiple audio bullet screens in the same playing interface of the current video are exclusively played. When one audio bullet screen is played, other audio bullet screens cannot be played at the same time. For example, when a user 3 is watching a video a via the playing interface of video a, if there are multiple audio bullet screens displayed in the playing interface of the video a, the user 3 may only click on one of the multiple audio bullet screens once to play a music corresponding to the audio bullet screen.

In the embodiments of the present disclosure, the audio bullet screens are played exclusively, so that the user can only play one audio bullet screen when watching the current video, thereby avoiding music in multiple audio bullet screens being played at the same time, which cause sound mixing and affects viewing of the current video.

In addition, after the audio bullet screen is transmitted to the user terminal playing the current video, the audio bullet screen may be deleted or blocked based on comment information of the user on the audio bullet screen, or a user that published the audio bullet screen may be rewarded based on comment information of another user on the audio bullet screen, the specific implementation is described as follows.

After transmitting the audio bullet screen to a user terminal playing the current video, the method further includes: receiving comment information of the second user on the audio bullet screen; and deleting or blocking the audio bullet screen based on the comment information.

In an implementation, a user may comment on the audio bullet screen in the current video interface. If an audio bullet screen has many positive reviews, a user who published the audio bullet screen may be rewarded, such as point rewards, level rewards, or medal rewards. If an audio bullet screen has many negative reviews, the audio bullet screen may be deleted or blocked to prevent the audio bullet screen from affecting the number of users who are to watch the current video.

Figure 4:
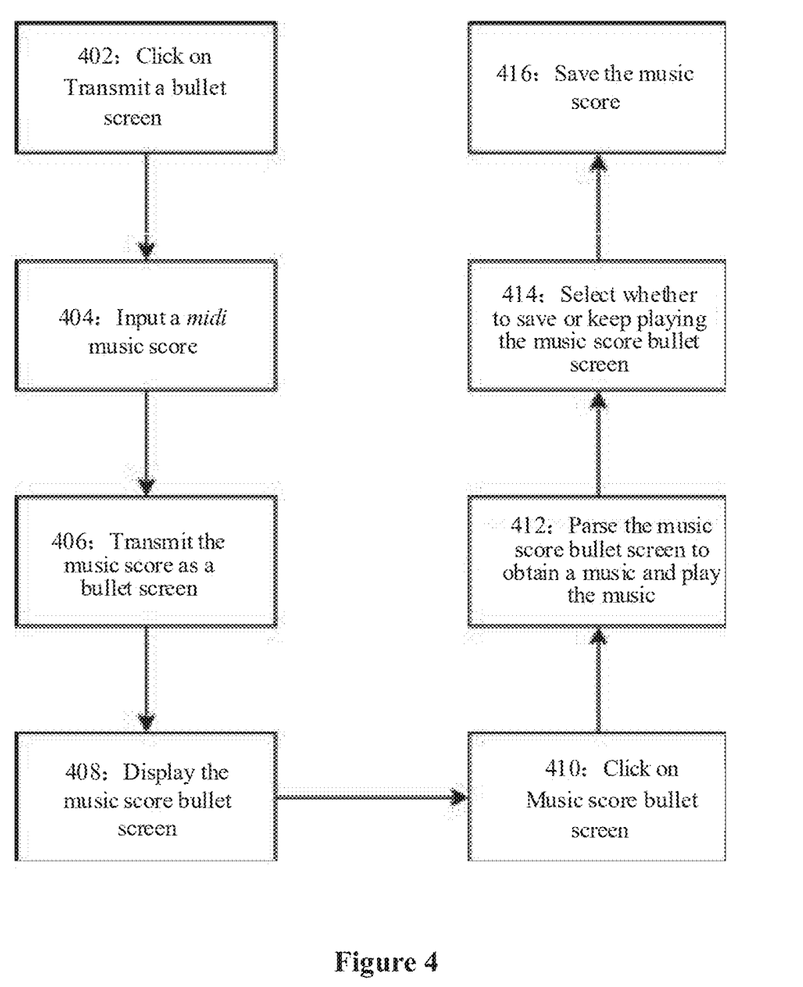
FIG. 4 is a processing flow chart of an audio bullet screen processing method according to an embodiment of the present disclosure.

Reference is made to FIG. 4, which is a processing flow chart of an audio bullet screen processing method according to an embodiment of the present disclosure. The method includes the following steps 402 to 416.

Specifically, the audio bullet screen processing method is described by taking a music score in the midi format as an example.

In step 402, "Transmit a bullet screen" is clicked on.

Specifically, clicking "Transmit a bullet screen" may indicate that the server receives an audio bullet screen generating instruction generated by the first user clicking the "Transmit a bullet screen" control on the user terminal, determines an audio bullet screen generating interface based on the audio bullet screen generating instruction, and returns the audio bullet screen generating interface to the first user.

In step 404, a midi music score is inputted.

Specifically, inputting a midi music score may indicate that the server receives a midi music score that is locally selected by the first user on the audio bullet screen generating interface or a midi music score generated by the first user by inputting a digital numbered musical notation.

In step 406, the music score is transmitted as a bullet screen.

Specifically, transmitting the music score as a bullet screen may indicate that after receiving the midi music score, a determining control on the audio bullet screen generating interface is clicked on, the server generates a music score bullet screen based on the midi music score.

In step 408, a music score bullet screen is displayed.

Specifically, the music score bullet screen being displayed on the bullet screen may indicate that the server transmits the generated music score bullet screen to all clients that play the video, so that the music score bullet screen is displayed in playing interfaces of the video.

In step 410, the music score bullet screen is clicked on.

Specifically, clicking on the music score bullet screen may indicate that the server receives a playing instruction generated by the second user by clicking on the music score bullet screen in the video playing interface.

In step 412, the music score bullet screen is parsed, into a music for playing.

Specifically, the music score bullet screen being parsed into a music for playing indicate that the server parses the music score bullet screen based on a music score parser library, and the specific implementation is described as follows.

Figure 5:
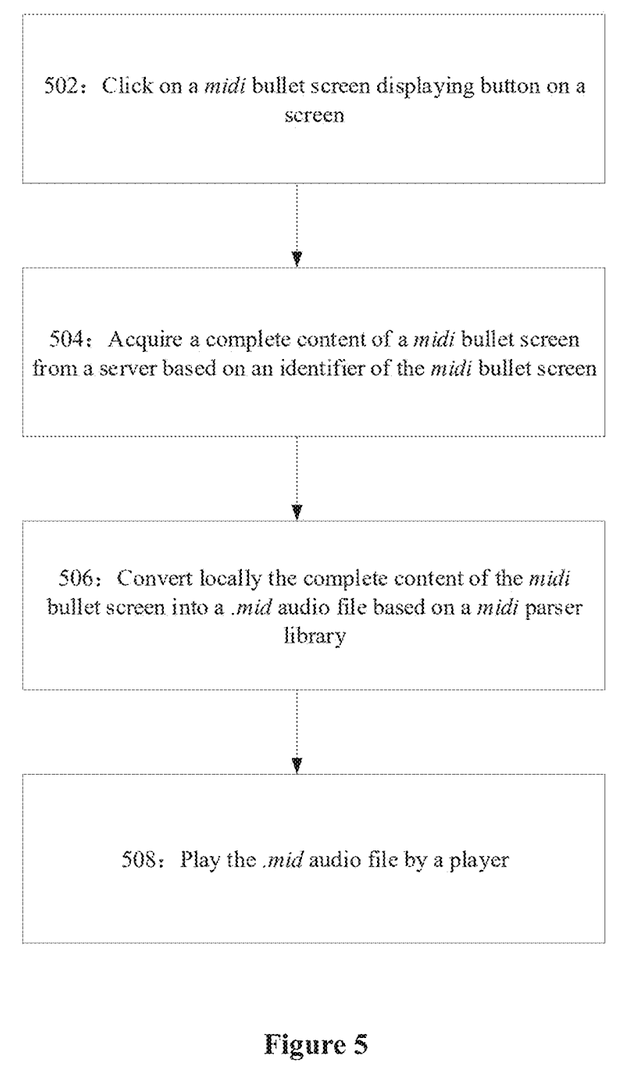
FIG. 5 is a flow chart of a process for parsing a music score bullet screen in an audio bullet screen processing method according to an embodiment of the present disclosure.

Reference is made to FIG. 5, which is a flow chart of a process for parsing a music score bullet screen in an audio bullet screen processing method according to an embodiment of the present disclosure. The method includes the following steps 502 to 508.

In step 502, the midi bullet screen playing button on a screen is clicked on.

Specifically, clicking on the midi bullet screen playing button on the screen may indicate that the server receives a playing instruction formed by the user clicking on the midi bullet screen playing button on the screen of the user terminal playing the video, and the playing instruction carries the identity document id of the midi bullet screen.

In step 504, a complete content of the midi bullet screen is acquired from the server according to the id of the midi bullet screen.

Specifically, the server acquiring the complete music score corresponding to the midi bullet screen according to the id of the midi bullet screen.

In step 506, the complete content of the midi bullet screen is converted locally into a .mid audio file based on a midi parser library.

Specifically, the .mid audio file is determined in the midi parsing library based on the complete music score corresponding to the midi bullet screen.

In step 508, the .mid audio file is displayed by a player.

Specifically, the player playing the .mid audio file may indicate that the .mid audio file is displayed by the player in the video playing interface, realize the playing of the midi bullet screen.

In the embodiment of the present disclosure, when the user clicks to play an audio bullet screen in the video playing interface, the audio bullet screen can be quickly and accurately parsed based on a parser library, so that an audio corresponding to the video bullet screen that is obtained through parsing can be outputted together with the video, thereby improving viewing experience of the user.

In step 414, it is selected whether to collect the music score bullet screen or keep playing the music score bullet screen.

Specifically, selecting whether to collect the music score bullet screen or keep playing the music score bullet screen may indicate that in a case of receiving a collection instruction of a second user for the music score bullet screen, the server collects the music corresponding to the music score bullet screen, or keeps playing the music score bullet screen in the playing interface of the video.

In step 416, the music score is saved.

Specifically, saving the music score may indicate that in a case of receiving a saving instruction of a second user for the music score bullet screen, the server saves the music corresponding to the music score bullet screen.

In the embodiments of the present disclosure, in some scenarios (for example, a scenario where a music in a video uploaded by a user is requested by another user), the audio bullet screen may be used to supplement the video capabilities, the user is allowed to input a section of midi music score, and the midi music score is displayed on a video screen in a form of text or music score. When another user is watching the video, the another user may choose to play the audio bullet screen, the audio bullet screen can be quickly and accurately parsed based on a parser library, so that an audio corresponding to the video bullet screen that is obtained through parsing can be outputted together with the video, thereby improving viewing experience of the user.

Figure 6:
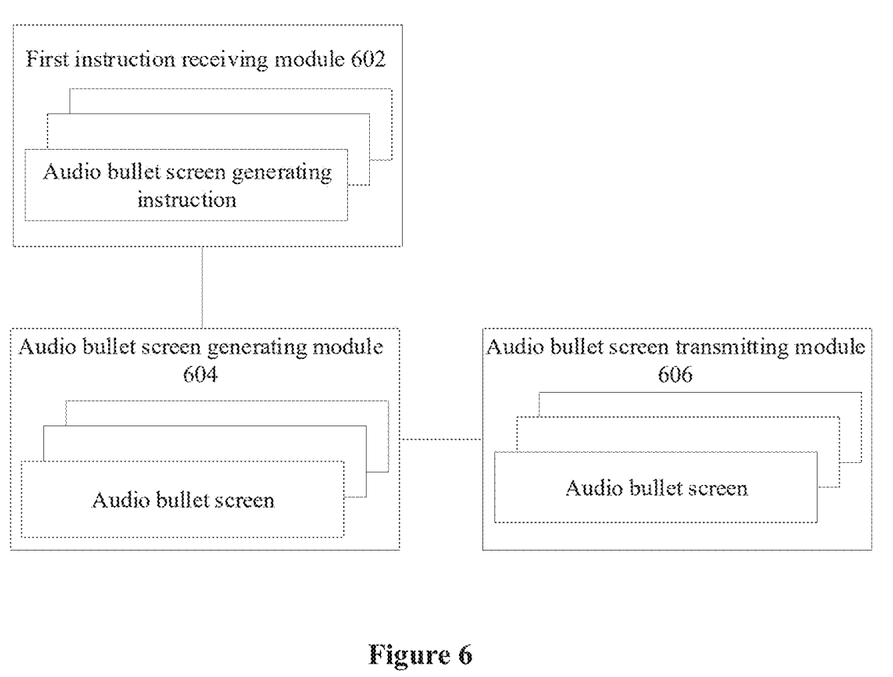
FIG. 6 is a schematic structural diagram of an audio bullet screen processing device according to an embodiment of the present disclosure.

Corresponding to the foregoing method embodiment, an audio bullet screen processing device is further provided according to an embodiment of the present disclosure. FIG. 6 is a schematic structural diagram of an audio bullet screen processing device according to an embodiment of the present disclosure. As shown in FIG. 6, the device includes: a first instruction receiving module 602, an audio bullet screen generating module 604, and audio bullet screen transmitting module 606. The first instruction receiving module 602 is configured to receive an audio bullet screen generating instruction sent by a first user for a current video, and return an audio bullet screen generating interface determined based on the audio bullet screen generating instruction to the first user. The audio bullet screen generating module 604 is configured to receive an audio music score determined by the first user on the audio bullet screen generating interface, and generate an audio bullet screen based on the audio music score. The audio bullet screen transmitting module 606 is configured to save the audio music score corresponding to the audio bullet screen, and transmit the audio bullet screen to a user terminal playing the current video.

In an embodiment, the audio bullet screen generating module 604 is further configured to: receive a numbered musical notation text in a preset format that is selected by the first user on the audio bullet screen generating interface, and determine the numbered musical notation text as the audio music score; or receive an audio file that is selected by the first user on the audio bullet screen generating interface, and parsing the audio file into an audio music score in a preset format.

In an embodiment, the audio bullet screen generating module 604 is further configured to: receive a digital numbered musical notation in a preset format that is inputted by the first user on the audio bullet screen generating interface, and determine the digital numbered musical notation as the audio music score.

In an embodiment, the device further includes: a matching module. The matching module is configured to acquire an audio bullet screen compliance condition preset for the current video, and compare the audio bullet screen with the audio bullet screen compliance condition.

In an embodiment, the audio bullet screen transmitting module 606 is further configured to: in the case that the audio bullet screen meets the audio bullet screen compliance condition, save the audio music score corresponding to the audio bullet screen, and transmit the audio bullet screen in a preset format to the user terminal playing the current video.

In an embodiment, the device further includes: a second instruction receiving module, an audio music score determining module, and a bullet screen playing module. The second instruction receiving module is configured to receive a playing instruction of a second user for the audio bullet screen of the current video, where the playing instruction carries an identifier of the audio bullet screen. The audio music score determining module is configured to determine an audio music score corresponding to the audio bullet screen based on the identifier of the audio bullet screen. The bullet screen playing module is configured to parse the audio music score into an audio, and play the audio for the second user on the user terminal playing the current video.

In an embodiment, the bullet screen playing module is further configured to: parse the audio music score based on a music score parser library, into an audio corresponding to the audio bullet screen.

In an embodiment, the bullet screen playing module is further configured to: play the audio for the second user in a case that the user terminal playing the current video is detected and a video sound of the current video is turned off.

In an embodiment, the device further includes: an audio playing module. The audio playing module is configured to stop the audio in a case that a playing instruction of the second user for another audio bullet screen of the current video is received when the audio is being played, and play an audio corresponding to the another audio bullet screen for the second user on the user terminal playing the current video.

In an embodiment, the device further includes: a comment information receiving module, and a bullet screen processing module. The comment information receiving module is configured to receive comment information of a second user on the audio bullet screen. The bullet screen processing module is configured to delete or block the audio bullet screen based on the comment information.

In the embodiment of the present disclosure, with the audio bullet screen processing device, when a user is watching a current video, an audio bullet screen containing a music matching with the current video can be generated in the form of bullet screens for the current video, such that the audio bullet screen can be played subsequently for another user when the user watches the current video. In this way, music sharing can be realized between users in the form of audio bullet screens, thereby improving interestingness and richness of bullet screens.

A technical solution of the audio bullet screen processing device in the embodiment is schematically described in the above. It is to be noted that the technical solution of the audio bullet screen processing device belongs to the same concept as the technical solution of the above audio bullet screen processing method. For details that are not described in detail in the technical solution of the audio bullet screen processing device, reference may be made to the description of the technical solution of the above audio bullet screen processing method.

Figure 7:
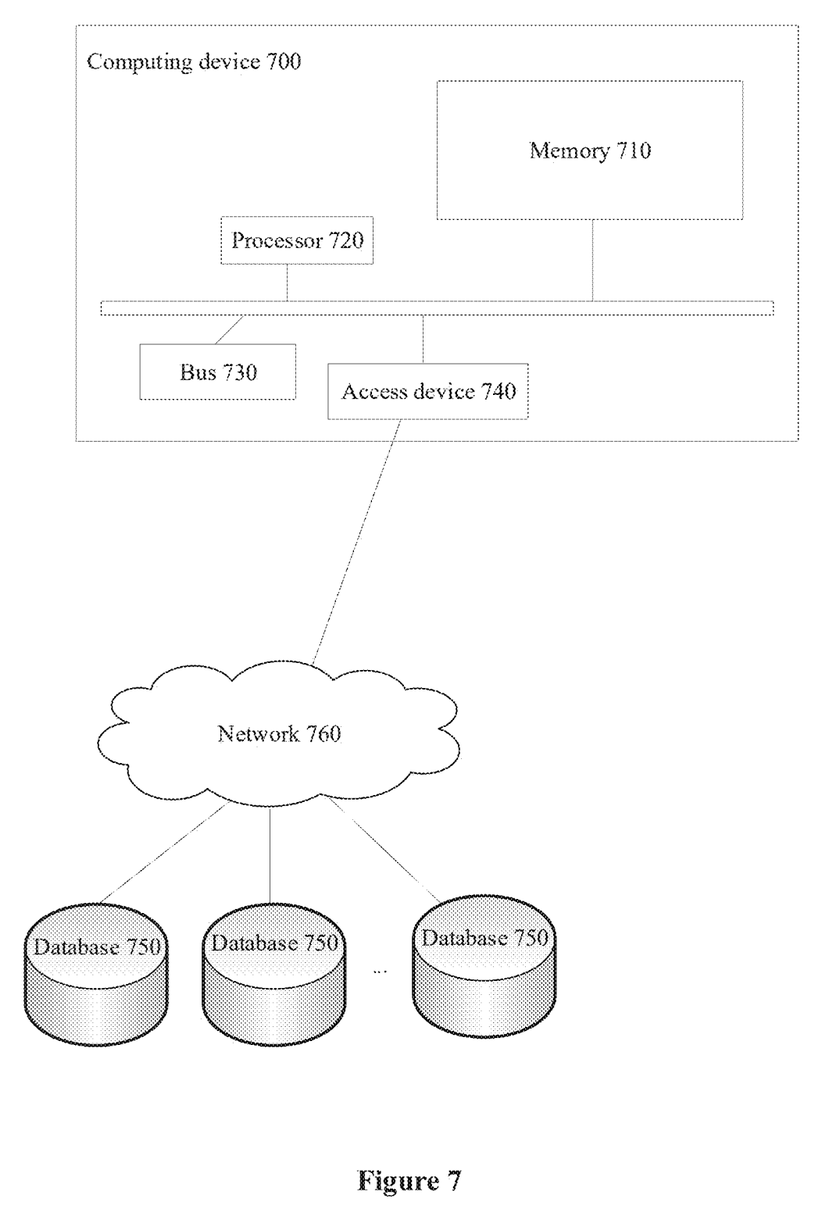
FIG. 7 is a structural block diagram of a computing device according to an embodiment of the present disclosure.

FIG. 7 is a structural block diagram of a computing device 700 according to an embodiment of the present disclosure. The components of the computing device 700 include but are not limited to a memory 710 and a processor 720. The processor 720 and the memory 710 are connected to each other through a bus 730, and the database 750 is used to store data.

The computing device 700 further includes an access device 740, which enables the computing device 700 to communicate via one or more networks 760. Examples of these networks include a public switched telephone network (PSTN), a local area network (LAN), a wide area network (WAN), a personal area network (PAN), or a combination of communication networks such as the Internet. The access device 740 may include one or more of any type of wired or wireless network interfaces (for example, a network interface card (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, and a near field communication (NFC) interface.

In an embodiment of the present disclosure, the above-described components of the computing device 700 may also be connected to other components not shown in FIG. 7, for example, via a bus. It is to be understood that the structural block diagram of the computing device shown in FIG. 7 is only for the purpose of example, and is not intended to limit the scope of the present disclosure. Those skilled in the art may add or replace other components as needed.

The computing device 700 may be any type of stationary or mobile computing device, including a mobile computer or a mobile computing device (for example, a tablet computer, a personal digital assistant, a laptop computer, a notebook computer, and a netbook), a mobile phone (for example, a smart phone), a wearable computing device (for example, a smart watch, smart glasses) or other types of mobile devices, or a stationary computing device such as a desktop computer or a PC. The computing device 700 may also be a mobile or stationary server.

The processor 720 is configured to execute computer-executable instructions to perform steps of the audio bullet screen processing method.

A technical solution of the computing device in the embodiment is schematically described in the above. It is to be noted that the technical solution of the computing device belongs to the same concept as the technical solution of the above audio bullet screen processing method. For details that are not described in detail in the technical solution of the computing device, reference may be made to the description of the technical solution of the above audio bullet screen processing method.

A computer-readable storage medium is further provided according to an embodiment of the present disclosure, which stores computer instructions. The computer instructions, when executed by a processor, perform steps of the audio bullet screen processing method.

A technical solution of the computer-readable storage medium in the embodiment is schematically described in the above. It is to be noted that the technical solution of the computer-readable storage medium belongs to the same concept as the technical solution of the above audio bullet screen processing method. For details that are not described in detail in the technical solution of the computer-readable storage medium, reference may be made to the description of the technical solution of the above audio bullet screen processing method.

Specific embodiments of the present disclosure are described in the above, and other embodiments are also within the scope of the claims. In some cases, actions or steps described in the claims may be performed in a different order than in the embodiments and still achieve desired results. In addition, processes shown in the drawings are not necessarily performed in the specific order or sequential order in order to achieve the desired results. In some embodiments, multi-task processing and parallel processing are also possible or may be advantageous.

The computer instructions include computer program codes, and the computer program codes may be in the form of source codes, object codes, executable files, or some intermediate forms. The computer-readable medium may include: any entity or device capable of carrying the computer program codes, a recording medium, a U disk, a mobile hard disk, a magnetic disk, an optical disk, a computer memory, a read-only memory (ROM), a random-access memory (RAM), an electrical carrier signal, a telecommunication signal, and a software distribution medium, and the like. It is to be noted that the content contained in the computer-readable medium may be appropriately added or deleted based on the requirements of the legislation and patent practice in the jurisdiction. For example, in some jurisdictions, based on the legislation and patent practice, the computer-readable medium does not include electrical carrier signals and telecommunication signals.

It is to be noted that, for simplicity of description, the above method embodiments are described as combinations of a series of operations, but those skilled in the art should know that the present disclosure is not limited to the described sequence of operations. According to on the present disclosure, some steps may be performed in another order or at simultaneously. Secondly, those skilled in the art should also know that the embodiments described in this specification are all preferred embodiments, and the operations and modules involved are not necessarily all required by the present disclosure.

In the above embodiments, the description of each embodiment has its own emphasis. For parts that are not described in detail in an embodiment, reference may be made to related descriptions in the other embodiments.

The preferred embodiments of the present disclosure disclosed above are only used to help explain the present disclosure. Details of the present disclosure are not descried completely in the preferred embodiments, and the present disclosure is not limit to the preferred embodiments described above. Apparently, many modifications and changes may be made based on the content of this specification. These preferred embodiments are selected and specifically described in this specification, in order to better explain the principles and practical applications of the present disclosure, so that those skilled in the art may understand and use the present disclosure. The present disclosure is only limited by the claims and full scope and equivalents thereof

What is claimed is:

1. A method of generating and presenting audio bullet screens, comprising:
    receiving a first instruction of generating an audio bullet screen associated with a video from a first client computing device associated with a first user;
    determining an interface based on the first instruction;
    transmitting data indicative of the interface to the first client computing device;
    receiving information indicative of a music score from the first client computing device, wherein the music score is determined based on user input by the first user via the interface;
    generating the audio bullet screen comprising music content for playback of music based on the music score, wherein the audio bullet screen comprises a clip of the music;
    storing the music score corresponding to the audio bullet screen; and
    transmitting data indicative of the audio bullet screen to a second computing device associated with a second user that is playing the video.

2. The method of claim 1, wherein the music score is determined based on a numbered musical notation text selected by the first user via the interface; or wherein the music score is determined based on an audio file selected by the first user via the interface, and the audio file is parsed into the music score.

3. The method of claim 1, wherein the music score is determined based on a digital numbered musical notation inputted by the first user via the interface.

4. The method of claim 1, wherein after the generating the audio bullet screen based on the music score, the method further comprises:
    comparing the generated audio bullet screen with one or more predetermined rules associated with the video; and
    determining whether the generated audio bullet screen satisfies the one or more predetermined rules associated with the video.

5. The method of claim 1, wherein the audio bullet screen is in a predetermined format.

6. The method of claim 1, further comprising:
    receiving a second instruction of playing the audio bullet screen from the second computing device, wherein the second instruction comprises an identifier of the audio bullet screen;
    determining the music score corresponding to the audio bullet screen based on the identifier of the audio bullet screen;
    parsing the music score into a first audio corresponding to the audio bullet screen; and
    transmitting data indicative of the first audio to the second client computing device for playing the first audio on the second client computing device.

7. The method of claim 6, wherein the parsing the music score into a first audio corresponding to the audio bullet screen further comprises parsing the music score into the first audio using a library of parsing music scores.

8. The method of claim 6, further comprising:
    detecting the second client computing device; and
    causing to turn off a sound of the video being played on the second client computing device before playing the first audio on the second client computing device.

9. The method of claim 6, further comprising:
    receiving another instruction of playing another audio bullet screen associated with the video from the second client computing device while playing the first audio is not finished; and
    causing to stop playing the first audio and causing to play a second audio corresponding to the another audio bullet screen on the second client computing device.

10. The method of claim 1, further comprising:
    receiving information indicative of a comment on the audio bullet screen from the second client computing device; and
    deleting or blocking the audio bullet screen based on the information indicative of the comment.

11. A system, comprising:
    at least one processor; and
    at least one memory communicatively coupled to the at least one processor and comprising computer-readable instructions that upon execution by the at least one processor cause the at least one processor to perform operations comprising:
    receiving a first instruction of generating an audio bullet screen associated with a video from a first client computing device associated with a first user;
    determining an interface based on the first instruction;
    transmitting data indicative of the interface to the first client computing device;
    receiving information indicative of a music score from the first client computing device, wherein the music score is determined based on user input by the first user via the interface;
    generating the audio bullet screen comprising music content for playback of music based on the music score, wherein the audio bullet screen comprises a clip of the music;
    storing the music score corresponding to the audio bullet screen; and
    transmitting data indicative of the audio bullet screen to a second computing device associated with a second user that is playing the video.

12. The system of claim 11,
wherein the music score is determined based on a numbered musical notation text selected by the first user via the interface;
wherein the music score is determined based on an audio file selected by the first user via the interface, and the audio file is parsed into the music score; or
wherein the music score is determined based on a digital numbered musical notation inputted by the first user via the interface.

13. The system of claim 11, the operations further comprising:
receiving a second instruction of playing the audio bullet screen from the second computing device, wherein the second instruction comprises an identifier of the audio bullet screen;
determining the music score corresponding to the audio bullet screen based on the identifier of the audio bullet screen;
parsing the music score into a first audio corresponding to the audio bullet screen; and
transmitting data indicative of the first audio to the second client computing device for playing the first audio on the second client computing device.

14. The system of claim 13, wherein the parsing the music score into a first audio corresponding to the audio bullet screen further comprises parsing the music score into the first audio using a library of parsing music scores.

15. The system of claim 13, the operations further comprising:
detecting the second client computing device; and
causing to turn off a sound of the video being played on the second client computing device before playing the first audio on the second client computing device.

16. The system of claim 13, the operations further comprising:
receiving another instruction of playing another audio bullet screen associated with the video from the second client computing device while playing the first audio is not finished; and
causing to stop playing the first audio and causing to play a second audio corresponding to the another audio bullet screen on the second client computing device.

17. The system of claim 11, the operations further comprising:
receiving information indicative of a comment on the audio bullet screen from the second client computing device; and
deleting or blocking the audio bullet screen based on the information indicative of the comment.

18. A non-transitory computer-readable storage medium, storing computer-readable instructions that upon execution by a processor cause the processor to implement operations comprising:
receiving a first instruction of generating an audio bullet screen associated with a video from a first client computing device associated with a first user;
determining an interface based on the first instruction;
transmitting data indicative of the interface to the first client computing device;
receiving information indicative of a music score from the first client computing device, wherein the music score is determined based on user input by the first user via the interface;
generating the audio bullet screen comprising music content for playback of music based on the music score, wherein the audio bullet screen comprises a clip of the music;
storing the music score corresponding to the audio bullet screen; and
transmitting data indicative of the audio bullet screen to a second computing device associated with a second user that is playing the video.

19. The non-transitory computer-readable storage medium of claim 18, the operations further comprising:
receiving a second instruction of playing the audio bullet screen from the second computing device, wherein the second instruction comprises an identifier of the audio bullet screen;
determining the music score corresponding to the audio bullet screen based on the identifier of the audio bullet screen;
parsing the music score into an audio corresponding to the audio bullet screen; and
transmitting data indicative of the audio to the second client computing device for playing the audio on the second client computing device.

20. The non-transitory computer-readable storage medium of claim 19, wherein the parsing the music score into an audio corresponding to the audio bullet screen further comprises parsing the music score into the audio using a library of parsing music scores.

* * * * *